United States Patent
Donnelly et al.

(10) Patent No.: US 12,248,597 B2
(45) Date of Patent: Mar. 11, 2025

(54) ENCRYPTED FILE NAME METADATA IN A DISTRIBUTED FILE SYSTEM DIRECTORY ENTRY

(71) Applicant: RED HAT, INC., Raleigh, NC (US)

(72) Inventors: Patrick Donnelly, Bedford, NH (US); Jeffrey Layton, Wake Forest, NC (US)

(73) Assignee: Red Hat, Inc., Raleigh, NC (US)

( * ) Notice: Subject to any disclaimer, the term of this patent is extended or adjusted under 35 U.S.C. 154(b) by 184 days.

(21) Appl. No.: 17/410,102

(22) Filed: Aug. 24, 2021

(65) Prior Publication Data

US 2023/0060837 A1     Mar. 2, 2023

(51) Int. Cl.
G06F 21/62      (2013.01)
G06F 16/13      (2019.01)
G06F 16/182     (2019.01)
G06F 21/60      (2013.01)

(52) U.S. Cl.
CPC ........ *G06F 21/6227* (2013.01); *G06F 16/137* (2019.01); *G06F 16/1827* (2019.01); *G06F 21/602* (2013.01)

(58) Field of Classification Search
CPC ............. G06F 21/6227; G06F 16/1827; G06F 16/137; G06F 21/602
See application file for complete search history.

(56) References Cited

U.S. PATENT DOCUMENTS

| | | |
|---|---|---|
| 7,401,220 B2 | 7/2008 | Bolosky et al. |
| 7,555,656 B2 | 6/2009 | Douceur et al. |
| 9,432,192 B1 * | 8/2016 | Pogde ................... H04L 9/0836 |
| 9,449,021 B2 | 9/2016 | Slegers et al. |
| 10,649,852 B1 * | 5/2020 | Starling .............. G06F 11/1469 |
| 10,726,147 B2 | 7/2020 | Ou-Yang et al. |

(Continued)

FOREIGN PATENT DOCUMENTS

CN     111581647 A     8/2020

OTHER PUBLICATIONS

Heurix, J., et al., "Pseudonymization with Metadata Encryption for Privacy-Preserving Searchable Documents," 45th Hawaii International Conference on System Sciences, 2012, https://www.researchgate.net/publication/261117875_Pseudonymization_with_Metadata_Encryption_for_Privacy-Preserving_Searchable_Documents.

(Continued)

*Primary Examiner* — Jung W Kim
*Assistant Examiner* — Alan L Kong
(74) *Attorney, Agent, or Firm* — Kilpatrick Townsend & Stockton LLP (57) ABSTRACT

Metadata including an encrypted file name can be attached to a directory entry for a file. For example, a method may include a processing device performing operations. The operations may include receiving, from a client system, a request to generate a directory entry in a distributed file system for a file. The operations may include generating the directory entry in a storage node of the plurality of storage nodes. The directory entry may include a file name and an index number. The operations may include encrypting the file name to generate an encrypted file name. The operations may include attaching the encrypted file name to the directory entry as metadata, the metadata being distinct from the file name and the index number. The metadata may be usable by the client system for decrypting the encrypted file name.

14 Claims, 4 Drawing Sheets

(56) References Cited

U.S. PATENT DOCUMENTS

| | | | |
|---|---|---|---|
| 2003/0070071 A1* | 4/2003 | Riedel | G06F 21/6218 |
| | | | 713/193 |
| 2004/0091114 A1* | 5/2004 | Carter | G06F 21/606 |
| | | | 380/259 |
| 2013/0290383 A1* | 10/2013 | Nitin | G06F 16/137 |
| | | | 707/822 |
| 2015/0142756 A1* | 5/2015 | Watkins | G06F 16/152 |
| | | | 707/692 |
| 2017/0053125 A1* | 2/2017 | Savagaonkar | G06F 21/60 |
| 2019/0044727 A1* | 2/2019 | Scott | H04L 9/3239 |
| 2021/0056075 A1* | 2/2021 | Thomsen | G06F 16/137 |
| 2022/0276799 A1* | 9/2022 | Kumar | G06F 3/067 |

OTHER PUBLICATIONS

Weinhold, C., et al., "jVPFS: Adding Robustness to a Secure Stacked File System with Untrusted Local Storage Components," Technische Universitat Dresden, Germany, 2011, https://www.usenix.org/legacy/event/atc11/tech/final_files/Weinhold.pdf.

* cited by examiner

ENCRYPTED FILE NAME METADATA IN A DISTRIBUTED FILE SYSTEM DIRECTORY ENTRY

TECHNICAL FIELD

The present disclosure relates generally to distributed file systems. More specifically, but not by way of limitation, this disclosure relates to attaching metadata to a directory entry in a distributed file system.

BACKGROUND

A distributed file system stores directories and files in a hierarchical structure across multiple disks of multiple storage servers. Distributed file systems are different from, for example, object storage in which data is stored in a flat non-hierarchical namespace. One type of distributed file system is the Ceph file system. Directories in a distributed file system are made up of directory entries that reference files stored in the distributed file system. Directory entries include information regarding the location and attributes of files. A user of the distributed file system interacts with directory entries in the directory to perform file management activities such as organization, storing, retrieval, naming, sharing, and encryption of files.

DETAILED DESCRIPTION

Overlaid encryption on a distributed file system is a common technique for user-controlled encryption of distributed file system contents without revealing file data to the underlying distributed file system technology. Overlaid encryption is popularly utilized in distributed file systems where the domain of systems administering the distributed file system is outside the control of the user protecting their files. Overlaid encryption may encrypt file names, some metadata, and all file data. But encrypting file names may create problems. For example, encrypting a file name may result in increasing the number of characters in the file name. Some operating systems, such as the Linux operating system, may include file name character limits. Also, some encryption procedures may produce an encrypted file name including characters that are not usable by certain operating systems. An unusable encrypted file name may require alteration, such as truncation or encoding, to become a file name usable for accessing the file. But altering encrypted file name in these ways may prevent future decryption for accessing the original unencrypted file name.

Some aspects of the present disclosure may overcome one or more of the abovementioned problems by attaching metadata including the encrypted file name to the directory entry for the file. In many examples, the directory entry may include only a file name for the file and with an index number for referencing an index node that includes the metadata and location of the file. The metadata including the encrypted file name may be separate from metadata included in index nodes. Attaching the encrypted file name to the directory entry separate from the metadata stored in the index node may allow a user of the distributed file system to access the encrypted file name. The encrypted file name may be altered to be used as a file name for calling or otherwise manipulating the file. The user may use the altered file name to access the encrypted file name, and may decrypt the encrypted file name to generate the original unencrypted file name.

In one particular example, a user may transmit a request to perform a file system operation to a distributed file system. For example, the file system operation can include generating a file, linking a file, or renaming a file. The distributed file system may be a Ceph File System ("CephFS") operating in a Linux operating environment. Receiving a request to perform a file system operation may generate a request to create a new directory entry for the file. The distributed file system may generate the directory request, including the file name and the index number pointing to a specific index node. The user may transmit a request for encrypting the file. In this example, the encryption library may be fscrypt, which may encrypt files and file names at a file system level. Fscrypt may allow the file system to encrypt some but not all files in the directory. The metadata for the file stored in the index node may remain unencrypted.

The encrypted file name may be unusable as a file name in a directory entry. For example, if the encrypted file name is too long, the distributed file system may use a hashing algorithm to truncate the length of the encrypted file name. Alternatively or additionally, if the encrypted file name includes prohibited characters, the distributed file system may encode the encrypted file name. Other methods of altering the encrypted file name to create a usable file name may be used. Although the encrypted name may be altered to become usable as a file name for accessing the directory entry, the unaltered encrypted file name may be attached to the directory entry to be accessible to a user of the distributed file system. In some examples, metadata that is separate from the file name and the index number and that includes other types of file information, may be attached to the directory entry. For example, metadata that is typically stored in the index node may be additionally or alternatively attached to the directory entry.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
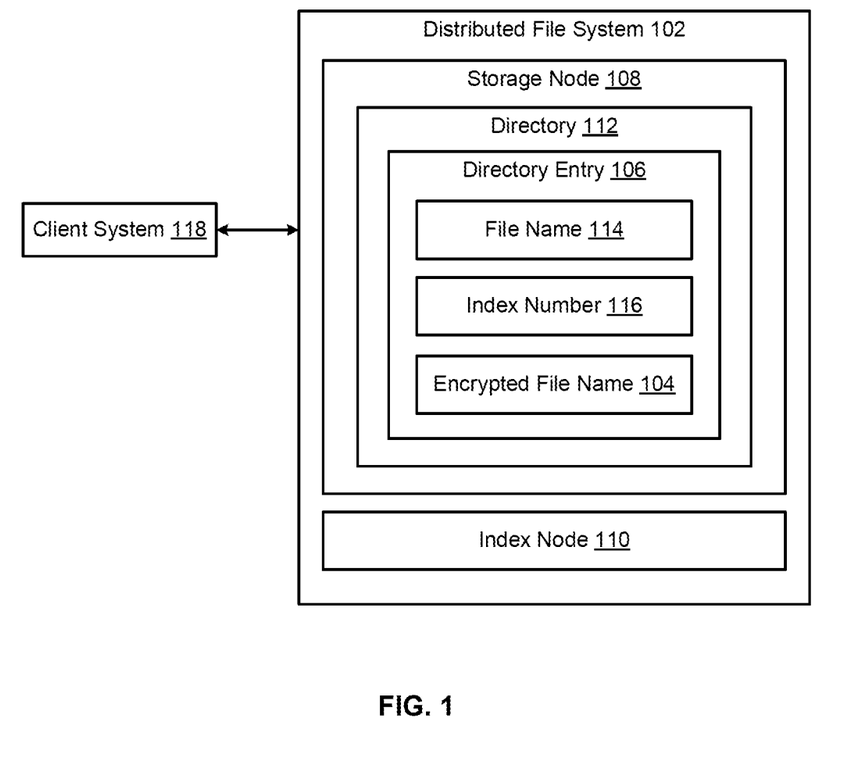
FIG. 1 is a block diagram of a system for attaching metadata including an encrypted file name to a directory entry in a distributed file system according to some aspects of the present disclosure.

FIG. 1 is a block diagram of an example of a system for attaching metadata including an encrypted file name 104 to a directory entry 106 in a distributed file system 102 according to some aspects of the present disclosure. The distributed file system 102 may include a storage node 108 and an index node 110. The storage node 108 may include a directory 112. The directory 112 may store one or more directory entries 106. A directory entry 106 may include a file name 114 and an index number 116.

A client system 118 may transmit a request for generating a directory entry 106 to the distributed file system 102. The request may include the file name 114. The distributed file system 102 may generate a directory entry 106 including the file name 114 and an index number 116. The distributed file system 102 may also generate an index node 110 for storing metadata for the file. The index number 116 may be an integer. The index number 116 may also be stored in a table to reference a location in the index node 110 at which the metadata for the file is stored. The metadata may include the author, time of file creation, modifications to the file, and any other information about the file.

In some examples, the file, including the file name, may be encrypted. For example, the fscypt library may be used to encrypt files in the distributed file system 102. The contents of the file and the file name 114 in the directory entry 106 may be encrypted, and the metadata stored in the index node 110 may not be encrypted. Encrypting the file name 114 may generate the encrypted file name 104. In some examples, the distributed file system 102 may encode the encrypted file name 104 to aid in data integrity for storage or transmission. For example, the encrypted file name 104 may be base64 encoded to translate the encrypted file name 104 from binary data to ASCII characters. In some examples, the encoded file name may replace the file name 114 in the directory entry 106. The encoded file name may be usable by the client system 118 for interacting with the directory entry 106. That is, the client system 118 may successfully reference the file name 114 that is the encoded file name in requests for interacting with the directory entry 106, such as moving or deleting the directory entry 106.

In some examples, the encrypted file name 104 or the encoded file name may not be usable by the client system 118 for interacting with the directory entry 106. For example, the number of characters in the encrypted file name 104 may exceed a maximum character limit allowed in a file name. For example, file names created in Linux operating systems may not exceed 255 characters. Encrypting the file name 114 may increase the number of characters. Additionally, encoding the encrypted file name 104 may increase the number of characters. If the number of characters in the encrypted file name 104 exceeds the maximum character limit, the distributed file system 102 may generate a truncated file name.

To truncate the encrypted file name 104, the distributed file system 102 may select an amount of characters in the encrypted file name 104 to be hashed. For example, the distributed file system 102 may select all characters in the encrypted file name 104 that come after the $192^{nd}$ character. The selected characters may be hashed to generate a string of text based on the selected characters. It may be impossible to extract the original selected characters from the hashed characters. The distributed file system 102 may append the hashed characters to the unhashed characters of the encrypted file name 104 to generate a truncated file name. So, for this example, the truncated file name may include 192 original unhashed characters and a number of hashed characters. The number of characters in the truncated file name may be less than the maximum character limit. In some examples, the encrypted file name 104 may be truncated via hashing before or after being encoded. If the encrypted file name 104 is truncated after encoding, the truncated file name may be encoded again. The file name 114 may be updated with the final encoded file name. One example of a hashing method is the cryptographic Secure Hash Algorithm ("SHA"), which may use the selected characters as an input to produce a 40 digit hexadecimal number.

Alternatively or additionally, the encrypted file name 114 may include one or more unusable characters. An unusable character may be a character that is blocked from usage in a file name, or a character that may cause difficulties for the distributed file system 102 when referenced. For example, a distributed file system 102 that uses a Linux operating system may prohibit the use of null characters "\0" or the path separator character "/" to be used in file names. In other distributed file systems 102 that use Windows, characters such as "/", "\", "?", or "%" may be prohibited or may cause problems when the file names are called. If the encrypted file name 114 includes one or more unusable characters, the encrypted file name 114 may be encoded in the manner described above to generate an encoded file name. Encoding the file name may convert the unusable characters to usable characters. The file name 114 may be updated with the encoded file name.

After replacing the file name 114 with the final encoded name, the distributed file system 102 may generate a third type of metadata to attach to the directory entry 106. The third type of metadata may include the encrypted file name 104. The client system 118 may access the directory entry 106 to access the encrypted file name 104. The client system 118 may decrypt the encrypted file name 104 to access the original file name. But, the client system 118 may interact with the directory entry 106 using the file name 114 that is the encoded file name, which may not be decrypted or decoded to access the original file name. Thus, the encrypted file name 104 remains secure, and the file may be accessed without requiring the original, unencrypted file name. The metadata including the encrypted file name 104 may be separate from the metadata stored in the index node 110.

FIG. 1 is illustrative and non-limiting. Other examples may include more components, fewer components, different components, or a different arrangement of the components shown in FIG. 1. For example, although the distributed file system 103 includes one storage node 108 and one index node 110 in the example of FIG. 1, the distributed file system 102 may include a larger number of storage nodes or index nodes in other examples. The directory 112 may also include a larger number of directory entries 106.

Figure 2:
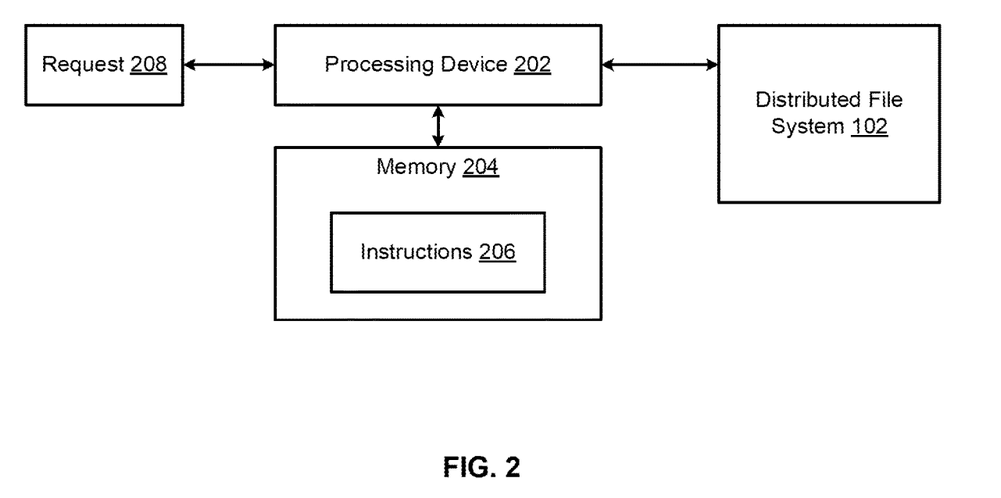
FIG. 2 is a block diagram of another system for attaching metadata including an encrypted file name to a directory entry in a distributed file system according to some aspects of the present disclosure.

FIG. 2 is a block diagram of another example of a system for attaching metadata including an encrypted file name 104 to a directory entry 106 in a distributed file system 102 according to some aspects of the present disclosure. The system includes a processing device 202 communicatively coupled to a memory 204. In some examples, the processing device 202 and the memory 204 can be part of a storage node, such as one of the storage node 108 of FIG. 1.

The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. In some examples, at least some of the memory 204 can include a medium from which the processing device 202 can read instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processing device 202 can receive a request 208 from a client system 118 to generate a directory entry 106 in the distributed file system 102. The processing device 202 can generate a directory entry including a file name 114 and an index number 116. The processing device 202 can use an encryption library to encrypt the file name 114. In some examples, the encrypted file name 104 may be unusable by the processing device 202 for performing operations to the directory entry 106, such as deleting or moving the directory entry 106. So, the processing device 202 may truncate and encode the encrypted file name 104 to generate an encoded file name for replacing the file name 114. The processing device 202 may attach metadata including the encrypted file name 104 to the directory entry 106. The processing device 202 may transmit the directory entry 106, including the encrypted file name 104 as metadata, to the client system 118.

Figure 3:
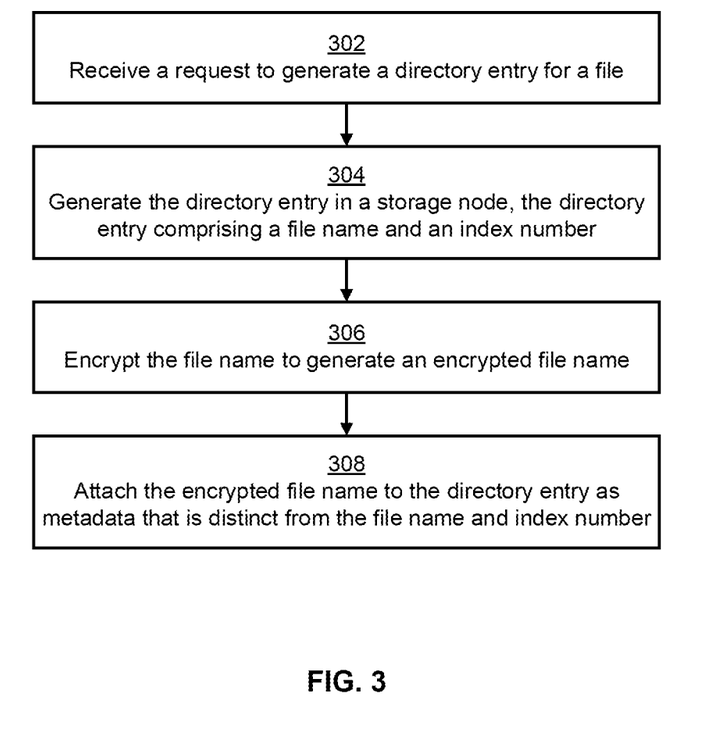
FIG. 3 is a flow chart of a process for attaching metadata including an encrypted file name to a directory entry in a distributed file system according to some aspects of the present disclosure.

In some examples, the processing device 202 can implement some or all of the steps shown in FIG. 3. Other examples can include more steps, fewer steps, different steps, or a different order of steps than is shown in FIG. 3. The steps of FIG. 3 are discussed below in reference to the components discussed above in relation to FIGS. 1 and 2.

FIG. 3 is a flow chart of an example of a process for attaching metadata including an encrypted file name 104 to a directory entry 106 in a distributed file system 102 according to some aspects of the present disclosure. In block 302, the processing device 202 can receive, from a client system 118, a request 208 to generate a directory entry 106 for a file. The request 208 may include a file name and metadata for the file.

In block 304, the processing device 202 can generate the directory entry 106 in a storage node 108 of the distributed file system 102. The directory entry 106 may include a file name 114. The file name 114 may be the file name provided by the client system 118. Alternatively, the processing device 202 may generate the file name 114. The directory entry 106 may also include an index number 116 generated by the processing device 202. The processing device 202 may generate an index node 110 including metadata for the file. The metadata in the index node 110 may include the metadata received from the client system 118. The index number 116 may be an integer pointing to the location of the index node 110 in the distributed file system 102. To access the metadata stored in the index node 110, the processing device 202 may use the index number 116 to locate the index node 110.

In block 306, the processing device 202 can encrypt the file name 114 to generate an encrypted file name 104. The encrypted file name 104 may be decrypted to generate the original file name 114. In some examples, the encrypted file name 104 may include too many characters or may include unusable characters that may prevent the encrypted file name 104 from being used to replace the file name 114. The processing device 202 may encode the encrypted file name 104 to remove unusable characters, and may replace the file name 114 with the encoded file name. In some examples, the processing device 202 may truncate the encrypted file name 104 to remove excess characters, and the truncated (and in some cases encoded) file name may be used to replace the file name 114.

In block 308, the processing device 202 can attach the encrypted file name 104 to the directory entry 106 as metadata that is distinct from the file name 114 and the index number 116. The processing device 202 may send the encrypted file name 104 with the directory entry 106 to the client system 118 after receiving a request for the directory entry 106.

Figure 4:
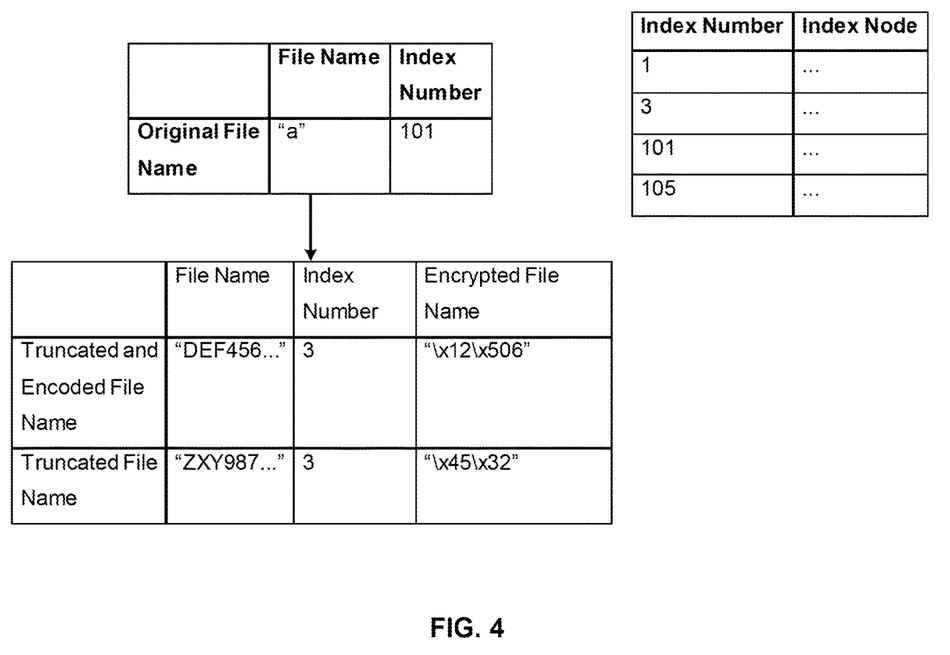
FIG. 4 is a diagram of a directory structure for a distributed file system according to some aspects of the present disclosure.

FIG. 4 is a diagram of an example of a directory structure for a distributed file system 102 according to some aspects of the present disclosure. The processing device 202 may generate a directory entry 106 for a file that includes an original file name "a" and an index number "101". The processing device 202 may also generate an index node 110 including metadata for the directory entry 106. The metadata may include file permissions, file type, and other such file information. The index number "101" may point to the location of the index node 110. Each index number and its associated index node 110 location may be stored in a table, such as the table shown in FIG. 4.

In some examples, multiple file names may reference the same index node 110. For example, a file may have multiple directory entries 106 with different file names that include a same index number 116. As shown in FIG. 4, the distributed file system 102 may include a directory entry 106 with an encrypted, truncated, and encoded file name "DEF456 . . . ", an index number "3", and an encrypted file name "\x12\x506." The distributed file system 102 may also include a directory entry 106 with a truncated file name "ZXY987 . . . ", an index number "3", and an encrypted file name "\x45\x32". The two directory entries have the same index number of "3" while including different file names 114 and encrypted file names 104, thus pointing to the same index node 110. This may be due to the file existing in multiple locations in the index node 110. Because the file may have different names depending on its location in the directory 112, the processing device 202 may attach the metadata including the encrypted file name 104 to the directory entry 106, rather than to the index node 110.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined with any other example to yield further examples.

What is claimed is:

1. A method comprising:
    receiving a first request to generate a directory entry in a distributed file system for a file;
    generating the directory entry in a directory stored in a storage node of a plurality of storage nodes, the directory entry comprising a file name and an index number, the index number referencing an index node of a plurality of index nodes that stores first metadata for the file;
    encrypting the file name to generate an encrypted file name;

encoding the encrypted file name to generate an encoded file name that replaces the file name in the directory entry, wherein the encoded file name is usable by a client system for performing a file system operation with respect to the file and the encrypted file name is unusable by the client system for performing the file system operation with respect to the file;

attaching the encrypted file name to the directory entry as second metadata, the second metadata being distinct from the encoded file name and the index number and being usable by the client system for decrypting the encrypted file name; and subsequent to attaching the encrypted file name to the directory entry as second metadata and encoding the encrypted file name to generate the encoded file name:

receiving, from the client system using the encoded file name, a second request for the encrypted file name;

retrieving, using the encoded file name from the second request, the second metadata comprising the encrypted file name in response to receiving the second request; and transmitting, to the client system, the retrieved second metadata comprising the encrypted file name.

2. The method of claim 1, further comprising:

in response to encrypting the file name to generate the encrypted file name, determining that the encrypted file name comprises a number of characters that is greater than a maximum character limit; and generating a truncated file name for the encrypted file name in response to determining that the number of characters is greater than the maximum character limit; and encoding the truncated file name to generate the encoded file name.

3. The method of claim 2, wherein generating the truncated file name further comprises:

hashing a first plurality of characters of the encrypted file name to generate a plurality of hashed characters, wherein the encrypted file name comprises the first plurality of characters and a second plurality of characters; and appending the plurality of hashed characters to the second plurality of characters, wherein the plurality of hashed characters with the second plurality of characters comprises a number of characters that is less than the maximum character limit.

4. The method of claim 1, wherein the encrypted file name includes one or more unusable characters, and wherein the encoded file name does not include one or more unusable characters.

5. The method of claim 1, wherein generating the directory entry further comprises generating the index node that is referenced by the index number.

6. A system comprising:

a plurality of storage nodes;

a plurality of index nodes;

a processing device; and a non-transitory computer-readable memory comprising instructions for the processing device, the instructions being executable by the processing device to cause the processing device to:

receive, from a client system, a first request to generate a directory entry for a file;

generate the directory entry in a directory stored in a storage node of the plurality of storage nodes, the directory entry comprising a file name and an index number, the index number referencing an index node of the plurality of index nodes that stores first metadata for the file;

encrypt the file name to generate an encrypted file name;

encode the encrypted file name to generate an encoded file name stored in the directory entry, wherein the encoded file name is usable by the client system for performing a file system operation with respect to the file and the encrypted file name is unusable by the client system for performing the file system operation with respect to the file;

attach the encrypted file name to the directory entry as second metadata, the second metadata being distinct from the encoded file name and the index number and being usable by the client system for decrypting the encrypted file name; and subsequent to attaching the encrypted file name to the directory entry as second metadata and encoding the encrypted file name to generate the encoded file name:

receive, from the client system using the encoded file name, a second request for the encrypted file name;

retrieve, using the encoded file name from the second request, the second metadata comprising the encrypted file name in response to receiving the second request; and transmit, to the client system, the retrieved second metadata comprising the encrypted file name.

7. The system of claim 6, wherein the instructions are further executable by the processing device for causing the processing device to:

in response to encrypting the file name to generate the encrypted file name, determine that the encrypted file name comprises a number of characters that is greater than a maximum character limit; and generate a truncated file name for the encrypted file name in response to determining that the number of characters is greater than the maximum character limit; and encoding the truncated file name to generate the encoded file name.

8. The system of claim 7, wherein the instructions are further executable by the processing device for causing the processing device to generate the truncated file name by:

hashing a first plurality of characters of the encrypted file name to generate a plurality of hashed characters, wherein the encrypted file name comprises the first plurality of characters and a second plurality of characters; and appending the plurality of hashed characters to the second plurality of characters, wherein the plurality of hashed characters with the second plurality of characters comprises a number of characters that is less than the maximum character limit.

9. The system of claim 6, wherein the encrypted file name comprises one or more unusable characters, and wherein the encoded file name does not comprise one or more unusable characters.

10. The system of claim 6, wherein the instructions for generating the directory entry further comprises generating the index node configured to be referenced by the index number.

11. A non-transitory computer-readable medium comprising program code that is executable by a processing device for causing the processing device to:

receive, from a client system, a first request to generate a directory entry in a distributed file system for a file;

generate the directory entry in a directory stored in a storage node of a plurality of storage nodes, the directory entry comprising a file name and an index number, the index number referencing an index node of a plurality of index nodes that stores first metadata for the file;

encrypt the file name to generate an encrypted file name;

encode the encrypted file name to generate an encoded file name stored in the directory entry, wherein the encoded file name is usable by the client system for performing a file system operation with respect to the file and the encrypted file name is unusable by the client system for performing the file system operation with respect to the file;

attach the encrypted file name to the directory entry as second metadata, the second metadata being distinct from the encoded file name and the index number and being usable by the client system for decrypting the encrypted file name; and subsequent to attaching the encrypted file name to the directory entry as second metadata and encoding the encrypted file name to generate the encoded file name:
  receive, from the client system using the encoded file name, a second request for the encrypted file name;
  retrieve, using the encoded file name from the second request, the second metadata comprising the encrypted file name in response to receiving the second request; and
  transmit, to the client system, the retrieved second metadata comprising the encrypted file name.

12. The non-transitory computer-readable medium of claim 11, further comprising program code that is executable by the processing device for causing the processing device to:

in response to encrypting the file name to generate the encrypted file name, determine that the encrypted file name comprises a number of characters that is greater than a maximum character limit; and generate a truncated file name for the encrypted file name in response to determining that the number of characters is greater than the maximum character limit; and encoding the truncated file name to generate the encoded file name.

13. The non-transitory computer-readable medium of claim 12, further comprising program code that is executable by the processing device for causing the processing device to generate the truncated file name by:

hashing a first plurality of characters of the encrypted file name to generate a plurality of hashed characters, wherein the encrypted file name comprises the first plurality of characters and a second plurality of characters; and appending the plurality of hashed characters to the second plurality of characters, wherein the plurality of hashed characters with the second plurality of characters comprises a number of characters that is less than the maximum character limit.

14. The non-transitory computer-readable medium of claim 11, wherein the encrypted file name comprises one or more unusable characters, and wherein the encoded file name does not comprise one or more unusable characters.

* * * * *